(12) United States Patent
Nottingham et al.

(10) Patent No.: US 7,426,906 B2
(45) Date of Patent: Sep. 23, 2008

(54) METHOD OF ASSEMBLING A RECEIVER COLLAR

(75) Inventors: John W. Nottingham, Bratenahl, OH (US); Nick E. Stanca, Westlake, OH (US); Craig Saunders, Rocky River, OH (US); Duane Gerig, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 11/746,120

(22) Filed: May 9, 2007

(65) Prior Publication Data

US 2007/0204810 A1 Sep. 6, 2007

Related U.S. Application Data

(62) Division of application No. 11/498,004, filed on Aug. 2, 2006, which is a division of application No. 11/065,963, filed on Feb. 25, 2005, now abandoned.

(51) Int. Cl.
*A01K 27/00* (2006.01)
(52) U.S. Cl. ...................... 119/859; 119/856
(58) Field of Classification Search ............... 119/859, 119/718–720, 856, 858; 368/282; 224/174, 224/179–181, 219, 221
See application file for complete search history.

(56) References Cited

U.S. PATENT DOCUMENTS

| | | | |
|---|---|---|---|
| 4,624,581 A | 11/1986 | Mock et al. | 368/282 |
| 4,856,687 A | 8/1989 | Iwamura et al. | 224/169 |
| 4,887,549 A | 12/1989 | Powell | 119/29 |
| 5,179,733 A | 1/1993 | Matsui | 455/344 |
| 5,601,054 A | 2/1997 | So | 119/718 |
| 5,742,256 A * | 4/1998 | Wakabayashi | 343/718 |
| D410,206 S | 5/1999 | Slater | D10/104 |
| D439,708 S | 3/2001 | Jenkins | D30/152 |
| 6,350,055 B1 | 2/2002 | Barras | 368/281 |
| D469,029 S | 1/2003 | So | D10/104 |
| D473,481 S | 4/2003 | So | D10/104 |
| D478,830 S | 8/2003 | So | D10/104 |
| D478,831 S | 8/2003 | So | D10/104 |
| D482,340 S * | 11/2003 | Cianfanelli | D14/144 |
| 6,830,014 B1 | 12/2004 | Lalor | 119/859 |
| D508,038 S * | 8/2005 | Bonadei | D14/138 |

* cited by examiner

*Primary Examiner*—Kimberly S Smith
(74) *Attorney, Agent, or Firm*—Pitts & Brittian, P.C.

(57) ABSTRACT

An animal collar assembly including a wireless receiver and a collar. The wireless receiver having a pair of first attachment features. The collar having a pair of ends, each end having a second attachment feature, each second attachment feature coupled with a corresponding first attachment feature and maintaining the corresponding collar end at a fixed orientation relative to the wireless receiver.

4 Claims, 4 Drawing Sheets

US 7,426,906 B2

METHOD OF ASSEMBLING A RECEIVER COLLAR

CROSS REFERENCE TO RELATED APPLICATIONS

This is a continuation of U.S. patent application Ser. No. 11/498,004, entitled "RECEIVER COLLAR", filed Aug. 2, 2006 which is a divisional of U.S. patent application Ser. No. 11/065,963, entitled "RECEIVER COLLAR", filed Feb. 25, 2005 now abandoned.

BACKGROUND OF THE INVENTION

1. Field of the Invention

The present invention relates to an animal collar assembly, and, more particularly, to an animal collar assembly including a radio frequency receiver for the modification of animal behavior.

2. Description of the Related Art

Stimulation devices are used for the modification of the behavior of an animal. The stimulation device is often associated with a collar worn by the animal and is provided to improve the behavior of the animal. Some stimulation devices include twin electrodes that are positioned against the skin of an animal, which delivers an electrical stimulus to modify the behavior of the animal. The stimulus can also be in the form of a vibration, an audible noise or other sensory stimulation to gain the attention of the animal.

A problem with known animal modification collars is that they allow the stimulation portion to be in a position in which it is not adequately coupled to the skin of the animal. When the stimulation portion of the collar is not adequately coupled, this leads to a lowered stimulation of the animal, which leads to ineffective training. To compensate for inadequate coupling to the skin the collar is often tightened, which can lead to discomfort to the animal. Another manner in which inadequate coupling to the skin is compensated for is to intensify the level of the stimulation, which can lead to over stimulation. These modifications of the stimulus device to overcome difficulties with coupling of the stimulation device to the animal can lead to less than optimal feedback to the animal.

What is needed in the art is a collar assembly which provides reliable coupling of the stimulation device to the animal.

SUMMARY OF THE INVENTION

The present invention provides an animal collar assembly including a housing having a collar that is rotatably attached in a constrained manner.

The invention comprises, in one form thereof, an animal collar assembly including a wireless receiver and a collar. The wireless receiver having a pair of first attachment features. The collar having a pair of ends, each end having a second attachment feature, each second attachment feature coupled with a corresponding first attachment feature and maintaining the corresponding collar end at a fixed orientation relative to the wireless receiver.

An advantage of the present invention is that the housing portion of the receiver collar is attached to the straps of the collar with limited rotational movement between the two.

Another advantage is that the collar of the present invention provides for more uniform coupling of the collar to the neck of the animal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
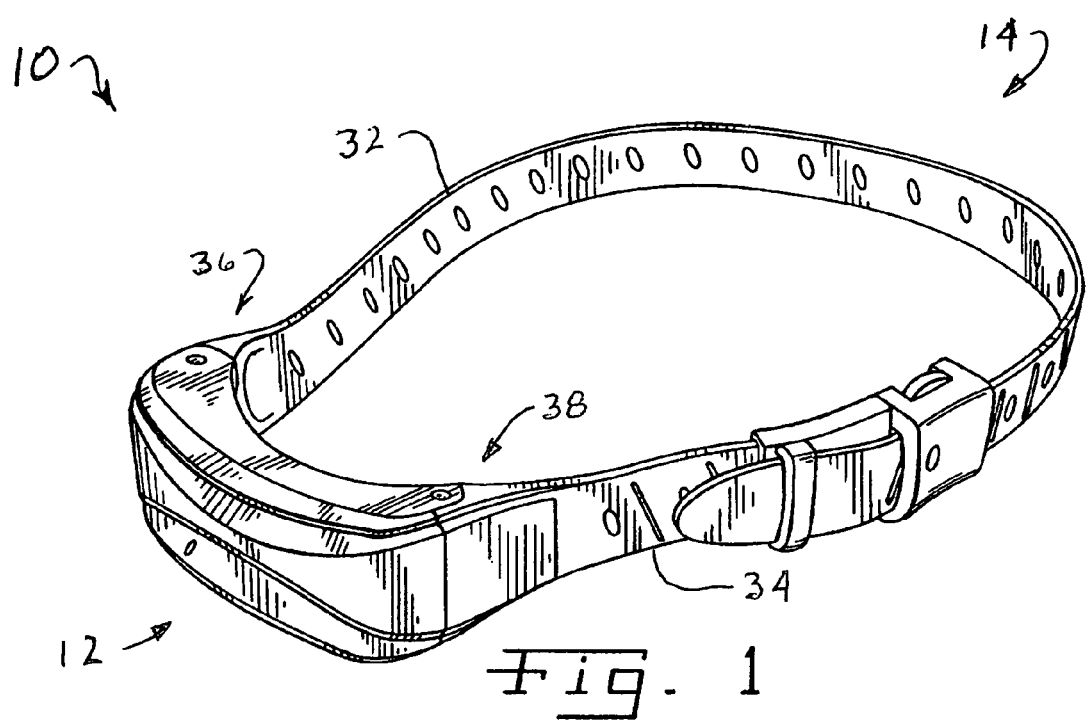
FIG. 1 is a perspective view of an embodiment of an animal collar assembly of the present invention.
Figure 2:
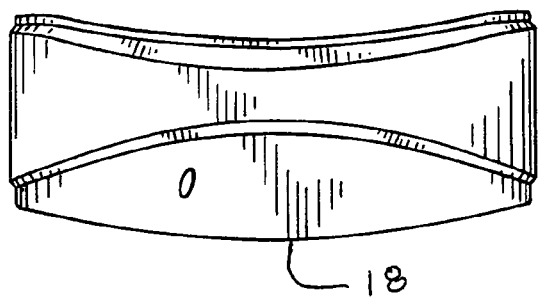
FIG. 2 is a front view of the housing of the collar assembly of FIG. 1.
Figure 3:
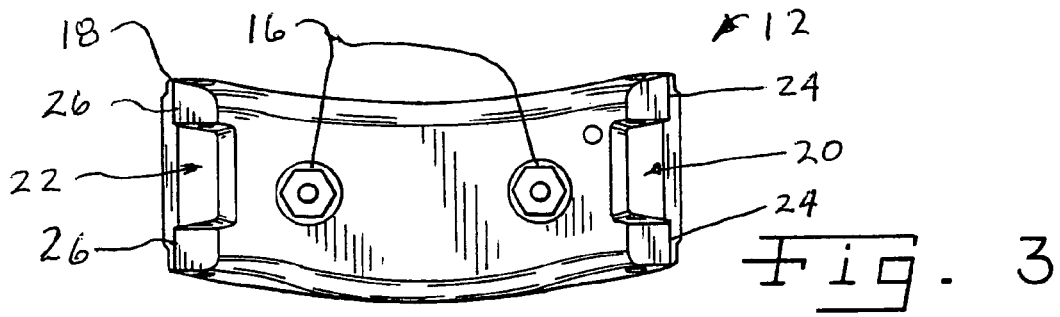
FIG. 3 is a rear view of the housing of FIGS. 1 and 2.
Figure 4:
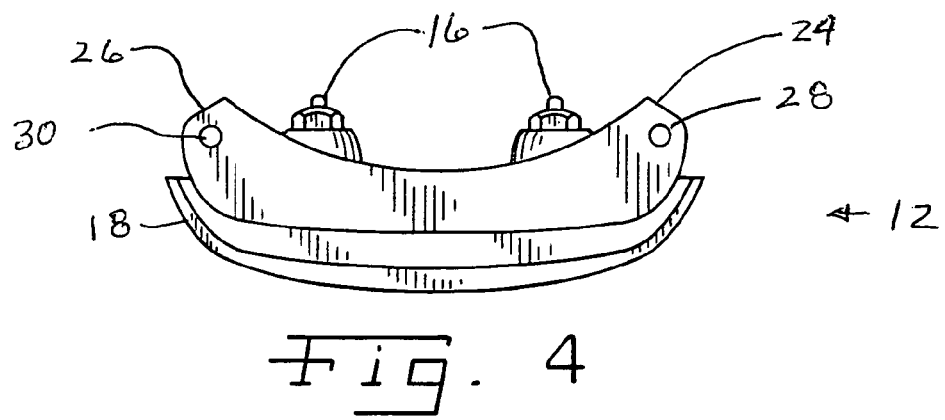
FIG. 4 is a top view of the housing of FIGS. 1-3.
Figure 5:
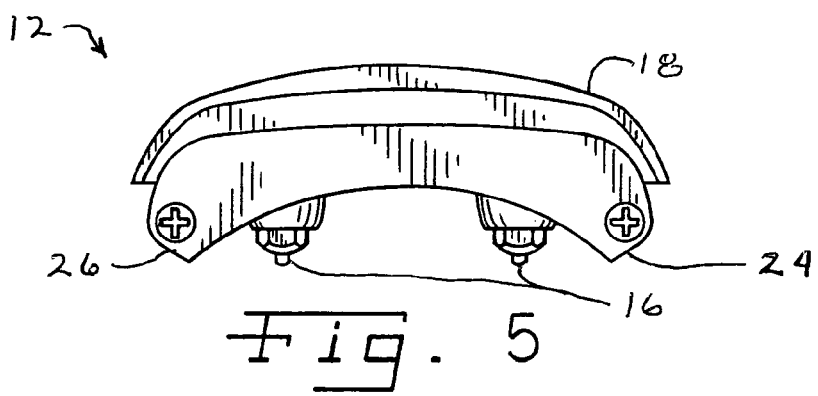
FIG. 5 is a bottom view of the housing of FIGS. 1-4.
Figure 6:
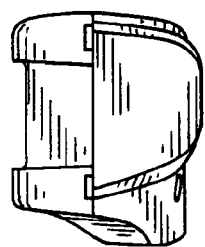
FIG. 6 is an end view of the housing of FIGS. 1-5.
Figure 7:
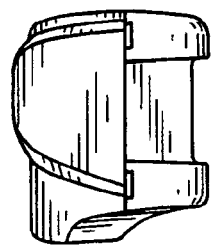
FIG. 7 is another end view of the housing of FIGS. 1-6.
Figure 8:
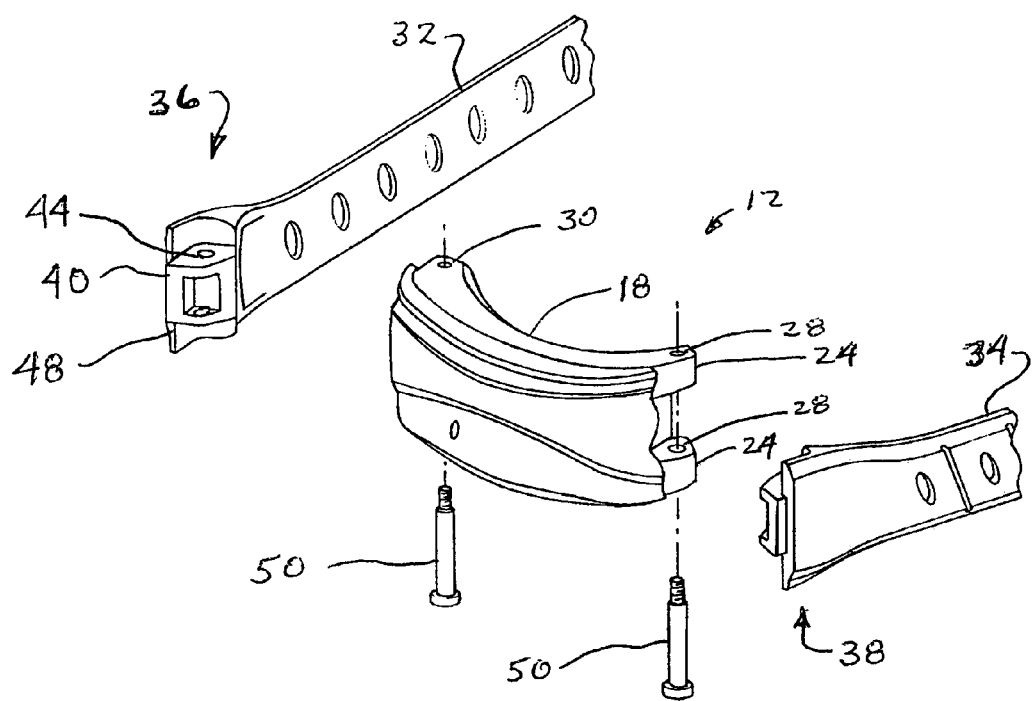
FIG. 8 is an exploded perspective view of the collar assembly of FIG. 1.

Referring now to the drawings, and more particularly to FIG. 1, there is shown an embodiment of an animal collar assembly 10, including a receiver assembly 12 and collar straps 14.

Now, additionally referring to FIGS. 2-8, receiver assembly 12 includes electrodes 16 attached to an arcuate housing 18. Electrodes 16 are electrically interconnected with a receiver assembly contained within housing 18 and they provide a stimulation to the animal, which is often a dog. Electrodes 16 are electrical conductors 16 that extend from a side wall of receiver assembly 12. The receiver contained within housing 18 receives radio frequency or other types of signals, in a wireless manner, processes them using predefined criteria and, when directed, applies a stimulation by way of electrodes 16 to the dog. Even though the stimulation is referred to as an electrical stimulation by way of electrode 16, it is understood that the stimulation may be of any variety in which sensory perception by the dog is stimulated to thereby modify the behavior of the dog. Advantageously, housing 18 has an arcuate formed shape approximating the curvature of the neck of the dog.

Housing 18 includes a pair of attachment features 20 and 22 in the form of a first shaped cavity 20 and a second shaped cavity 22. Housing 18 additionally includes a first set of protrusions 24 and a second set of protrusions 26. Cavities 20 and 22 are substantial mirror images of each other and provide for the interconnection between straps 14 and housing 18. Cavities 20 and 22 are generally concave in shape. Protrusions 24 and protrusions 26 are substantial mirror images of each other. Protrusions 24 and 26 extend beyond cavities 20 and 22 and have holes 28 and 30, respectively, therethrough. Holes 28 and holes 30 allow for the insertion of a pin, screw or other fastener through protrusions 24 and 26 and through accommodating holes in straps 14 for the connection of assembly 12 and straps 14.

Straps 14 form a collar 14 that include a first strap 32 and a second strap 34. Strap 32 has a mating end 36 and strap 34 has a mating end 38. Mating ends 36 and 38 are provided with attachment features which accommodate attachment features 20 and 22 of housing 18 to constrain the rotational movements of straps 14 relative to receiver housing 18. Mating end 36 includes an attachment feature 40 also known as a lug 40 having a hole 44 therethrough and an end surface 48. Lug 40 extends from along a side of strap 32 in a convex manner and substantially fills cavity 20 when assembled into receiver collar assembly 10. Lug 40 may have a hollow concave portion therein. Constraining device 50 is inserted through holes 30 and 44 coaxially align holes 44 and 30, thereby attaching strap 32 to housing 18. The combination of end surface 48 and lug 40 are mated with cavity 20 to constrain the rotational movement of strap 32 relative to housing 18. This substantially provides a continuation of the arcuate shape of the housing 18 and imparts an initial angular direction to strap 32. Strap 34 has an attachment feature like that of strap 32 and is connected by way of holes 28 in a substantially similar manner as strap 32 is connected to housing 18.

Advantageously, straps 14 have an initial angular relationship with housing 18, which holds receiver assembly 12, so that it more readily couples with the neck of a dog. Even though straps 14 are flexible, the rotational movement of receiver assembly 12 is constrained by the present invention. The relative limited rotational movement between straps 14 and housing 18 contributes to maintaining the generally circular shape of collar assembly 10. The angular relationship is fixedly maintained by the attachment features of collar 14 and housing 18. As a result electrodes 16 are maintained at a fixed angular relationship to the attachment features of collar 14. The angular relationship is an acute angle of between 30° and 80° and preferably between 45° and 75°.

Alternatively, the present invention may allow straps 14 to rotate inwardly from the positioned depicted in FIG. 1, but be constrained from rotating outwardly by way of end surface 48 and its being abutted against a portion of housing 18.

Receiver collar assembly 10 can be assembled by aligning lug 40 and inserting it into a cavity 20 or 22 and then inserting constraining device 50, in the form of a pin or other constrained fastener, through holes 30 and 44 to couple strap 32 to housing 18. In a similar manner, strap 34 may be connected to the remaining cavity with the insertion of another device 50.

While cavities 20 and 22 have been depicted in housing 18, housing 18 could have a protrusion and straps 14 have a recess or cavity, thereby reversing the attributes of the housing and the strap, yet accomplishing the same feature as depicted in the figures.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of assembling a behavior modification collar configured for being worn around the neck of an animal, said behavior modification collar including a housing and a plurality of straps, said method comprising the steps of:

placing a stimulation device in a housing, said housing being substantially rigid, said housing having a first cavity and a second cavity, said housing further having at least one protrusion, each of said plurality of straps having a mating end including one of a lug to accommodate said cavity and a recess to accommodate said protrusion, wherein each mating end includes a wall including an end surface configured for constraining outward rotational movement of said mating end; and affixing a lug located proximate an end of a first strap in said first cavity, said wall being coupled with said lug and at least partly defining said recess, wherein said wall includes a concave inside surface coupled with said lug and at least partly defining said recess, and wherein said lug extends from an inside surface of said wall, said lug defining a convex configuration.

2. The method of claim 1, further comprising the step of affixing a lug of said second strap to said second cavity, said wall being coupled with said lug and at least partly defining said recess, wherein said wall includes a concave inside surface coupled with said lug and at least partly defining said recess, and wherein said lug extends from an inside surface of said wall, said lug defining a convex configuration.

3. The method of claim 2, wherein said lug of said first strap is limitedly rotatable in said first cavity and said lug of said second strap is limitedly rotatable in said second cavity.

4. The method of claim 3, wherein said lug of said first strap is substantially non-rotatable in said first cavity and said lug of said second strap is substantially non-rotatable in said second cavity.

* * * * *